(12) United States Patent
Usui et al.

(10) Patent No.: US 10,289,248 B2
(45) Date of Patent: May 14, 2019

(54) CONTROL CIRCUIT AND CONTROL METHOD OF TOUCH PANEL, AND TOUCH PANEL INPUT DEVICE AND ELECTRONIC DEVICE USING THE SAME

(71) Applicant: ROHM CO., LTD., Ukyo-ku, Kyoto (JP)

(72) Inventors: Hirotoshi Usui, Kyoto (JP); Naoki Tada, Kyoto (JP); Hiroshi Yamashita, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 68 days.

(21) Appl. No.: 15/480,679

(22) Filed: Apr. 6, 2017

(65) Prior Publication Data
US 2017/0293397 A1    Oct. 12, 2017

(30) Foreign Application Priority Data
Apr. 8, 2016 (JP) ................................. 2016-078069

(51) Int. Cl.
*G06F 3/041* (2006.01)
*G02F 1/1333* (2006.01)

(52) U.S. Cl.
CPC ........ *G06F 3/0418* (2013.01); *G02F 1/13338* (2013.01)

(58) Field of Classification Search
CPC .................. G06F 3/045; G06F 3/0416; G06F 2203/04104
See application file for complete search history.

(56) References Cited

U.S. PATENT DOCUMENTS

| | | | |
|---|---|---|---|
| 8,390,596 B2 | 3/2013 | Tada | |
| 8,860,673 B2 | 10/2014 | Tada et al. | |
| 2014/0043562 A1* | 2/2014 | Kikuchi | G01R 19/10 349/61 |
| 2014/0168113 A1* | 6/2014 | Abe | G06F 3/045 345/173 |
| 2015/0261161 A1* | 9/2015 | Waida | G03G 15/5029 356/369 |

FOREIGN PATENT DOCUMENTS

| | | | | |
|---|---|---|---|---|
| JP | 2009048233 A | | 3/2009 | |
| WO | 2012073261 | * | 6/2012 | ............. G06F 3/045 |

* cited by examiner

*Primary Examiner* — Yuzhen Shen
(74) *Attorney, Agent, or Firm* — Cantor Colburn LLP

(57) ABSTRACT

A control circuit of a touch panel is disclosed. The touch panel includes first and second terminals drawn from a first resistive film; and third and fourth terminals drawn from a second resistive film. The control circuit includes a coordinate detection circuit configured to generate an impedance detection signal for an impedance of the touch panel and a voltage detection signal for at least one of voltages of the first to fourth terminals, which are used for generating a coordinate touched by a user. The control circuit further includes a memory configured to store initial data corresponding to an initial state impedance of at least one predetermined path of the touch panel. A calibration circuit of the control circuit acquires an operation state impedance of the path and calibrate the coordinate detection circuit based on detection data corresponding to the operation state impedance and the initial state impedance.

19 Claims, 11 Drawing Sheets

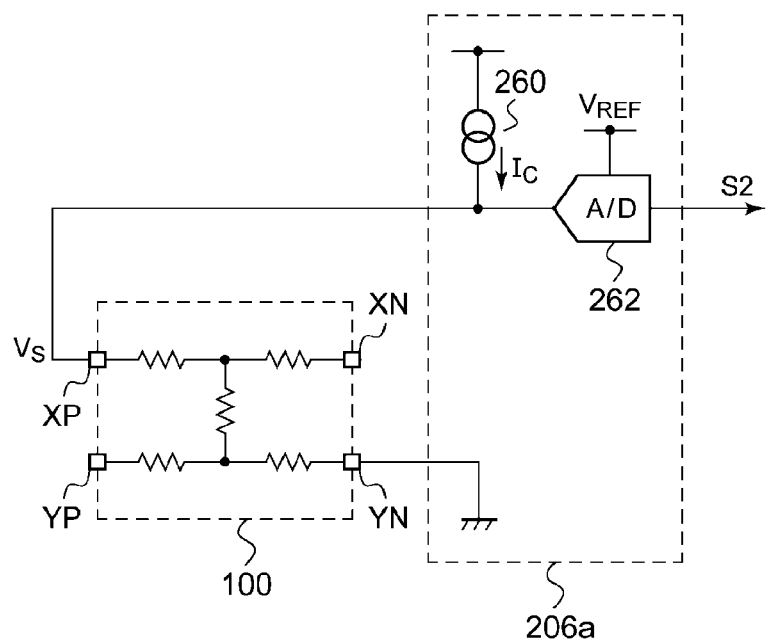

CONTROL CIRCUIT AND CONTROL METHOD OF TOUCH PANEL, AND TOUCH PANEL INPUT DEVICE AND ELECTRONIC DEVICE USING THE SAME

CROSS-REFERENCE TO RELATED APPLICATION

This application is based upon and claims the benefit of priority from Japanese Patent Application No. 2016-078069, filed on Apr. 8, 2016, the entire contents of which are incorporated herein by reference.

TECHNICAL FIELD

The present disclosure relates to a resistive film type touch panel.

BACKGROUND

Recently, electronic devices such as computers, mobile phones, personal digital assistants (PDAs), or the like having an input device for allowing a finger to make contact therewith to operate the electronic devices have been mainstreamed. As such an input device, a resistive film type touch panel (touch sensor) or the like is known.

FIG. 1 schematically illustrates a resistive film type touch panel. A resistive film type touch panel (hereinafter, simply referred to as a "touch panel") 100 has a first resistive film 102, a second resistive film 104, a pair of X electrodes 106, and a pair of Y electrodes 108. For the sake of explanation, the X-axis and the Y-axis are taken as the directions of illustration. The first resistive film 102 and the second resistive film 104 are disposed to face each other with a gap therebetween. The pair of X electrodes 106 is formed along two opposite sides of the first resistive film 102 extending in the Y direction. Further, the pair of Y electrodes 108 is formed along two opposite sides of the second resistive film 104 extending in the X direction. Wirings (terminals) XP and XN are drawn from the pair of X electrodes 106, and wirings YP and YN are drawn from the pair of Y electrodes 108.

When a user makes contact at an arbitrary point (contact point) PT, the first resistive film 102 and the second resistive film 104 contact each other at that point PT. The contact resistance is indicated by RC. When detecting an X coordinate, a constant voltage (driving voltage) VDRV is applied between the pair of X electrodes 106 so that an electric potential Vx is generated at the contact point PT. The electric potential Vx is obtained by dividing the constant voltage VDRV by resistors Rx1 and Rx2.

$$Vx = VDRV \times Rx1/(Rx1+Rx2)$$

The resistors Rx1 and Rx2 have values corresponding to the X coordinates, respectively. When the wirings YP and YN have high impedance, the electric potential Vx of the contact point is observed as an electric potential of the wirings YP and YN through the second resistive film 104. When detecting a Y coordinate, a constant voltage VDRV is similarly applied between the pair of Y electrodes 108 so that an electric potential Vy of the first resistive film 102 is measured.

$$Vy = VDRV \times Ry1/(Ry1+Ry2)$$

A touch panel that is compatible with multi-touch has been required in recent years. As a distance between two points of multiple touches is longer, the combined impedance of the first resistive film 102 and the second resistive film 104 is decreased. Thus, it is possible to detect coordinates of two points by detecting the combined impedance.

Here, a resistance value of a resistive film and contact resistance is changed depending on the temperature and aging. Further, the amount of change varies depending on a material or structure. Thus, in the related art touch panel, there was a problem that, when a period of time has lapsed, errors of coordinates become large, especially at the time of multi-touch. In this context, once the panel is deteriorated, it was necessary to recall the product, calibrate it, and release it again.

SUMMARY

The present disclosure provides some embodiments of a touch panel and a control circuit capable of suppressing degradation in accuracy of coordination detection due to the aged deterioration.

According to one embodiment of the present disclosure, there is provided a control circuit of a touch panel. The touch panel includes: a first resistive film and a second resistive film arranged with a gas therebetween; a first terminal and a second terminal drawn from two opposing sides of the first resistive film; and a third terminal and a fourth terminal drawn from two opposing sides of the second resistive film. The control circuit includes: a coordinate detection circuit including an impedance detection circuit configured to generate an impedance detection signal corresponding to impedance of the touch panel and a voltage detection circuit configured to generate a voltage detection signal corresponding to at least one of voltages of the first terminal, the first terminal, the second terminal, the third terminal, or the fourth terminal, wherein the impedance detection signal and the voltage detection signal are used for generating coordinates touched by a user; a memory; and a calibration circuit.

In an initial state, initial data corresponding to an initial state impedance of at least one predetermined path of the touch panel measured in advance is stored in the memory. The calibration circuit is configured to acquire an operation state impedance of the at least one predetermined path, which is measured in an operation state, and calibrate the coordinate detection circuit based on detection data corresponding to the operation state impedance of the at least one predetermined path and the initial data corresponding to the initial state impedance of the at least one predetermined path.

According to the present embodiment, a relationship between impedance of a certain path of the panel measured when used and impedance of the same path of the panel measured in the initial state, in other words, a relationship between the detection data and the initial data indicates a degree of aged deterioration. According to the present embodiment, it is possible to suppress degradation in the precision of the coordinate detection due to the aged deterioration of the touch panel by calibrating the coordinate detection circuit as necessary.

At least one reference point may be defined on the touch panel. The at least one predetermined path corresponds to the at least one reference point, and when the corresponding reference point is one-point touched, each path may be a path from one side of the first terminal and the second terminal to one side of the third terminal and the fourth terminal.

It may be desirable because this path includes all of upper and lower resistive films and contact resistance.

The calibration circuit may be configured to acquire the operation state impedance of the path when the coordinate detection circuit detects a one-point touch in the operation state and a coordinate of the one-point touch corresponds to the at least one reference point.

The expression "the coordinates detected by the coordinate detection circuit correspond to the reference point" may include not only a case where the coordinates completely match the reference point but also a case where the coordinates are included in a nearby predetermined area including the reference point. Thus, it is possible to measure impedance when the contact resistance is positioned at the reference point (or its neighborhood) when used.

The at least one predetermined path may include a plurality of paths. Each of the initial data and the detection data may correspond to an average value of some of impedances of the plurality of paths.

Thus, it is possible to improve the precision of the calibration.

The at least one predetermined path may include a plurality of paths. The calibration circuit may be configured to calibrate the coordinate detection circuit when the impedances of all of the plurality of paths are measured.

Thus, it is possible to improve the precision of the calibration.

At least one of the at least one reference point may be determined to be a position which is touched by the user more times statistically than other reference points. Thus, it is possible to align the data necessary for calibration within a short time.

The calibration circuit may be configured to correct scaling of the impedance detection circuit. It is possible to remove the influence of the aged deterioration by correcting the scaling, i.e., a relationship between an actual resistance value and a measured resistance value.

The impedance detection circuit may include: an I/V conversion circuit configured to convert a current flowing through the touch panel into a voltage; and an A/D converter configured to convert an output voltage of the I/V conversion circuit to a digital value. Since the digital value generated by the A/D converter is proportional to a current of the touch panel, it is possible to acquire a value (i.e., conductance) proportional to a reciprocal of the impedance of the touch panel.

The calibration circuit may be configured to correct a gain of the I/V conversion circuit. The calibration circuit may be configured to correct a reference voltage to be supplied to the A/D converter.

The calibration circuit may be configured to correct an output value of the A/D converter.

The coordinate detection circuit may include a coordinate generating circuit configured to generate coordinates touched by the user. The calibration circuit may be configured to correct calculation processing of the coordinate generating circuit.

The calibration circuit may be configured to calibrate the coordinate detection circuit when a difference between the initial data and the detection data is greater than a first threshold value. When the difference between the initial data and the detection data is large to a certain extent, it is possible to improve the precision by regarding it as the aged deterioration and taking it as a correction target.

The calibration circuit may be configured not to calibrate the coordinate detection circuit when a difference between the initial data and the detection data is greater than a second threshold value defined higher than the first threshold value. When the difference is too large, it is possible to improve the accuracy by determining it as noise and excluding it from the calibration.

The calibration circuit may be configured to update the initial data of the memory based on the detection data. Thus, it is possible to improve the precision of coordinate detection immediately after activation of the control circuit for the touch panel in which the aged deterioration has been in progress.

The at least one predetermined path may include a path from the first terminal to the second terminal. Since the resistance between the first terminal and the second terminal indicates resistance of the first resistive film itself, it is possible to appropriately calibrate the aged deterioration of the first resistive film.

The at least one predetermined path may include a path from the third terminal to the fourth terminal. Since the resistance between the third terminal and the fourth terminal indicates resistance of the second resistive film itself, it is possible to appropriately calibrate the aged deterioration of the second resistive film.

The control circuit may be integrated on a single semiconductor substrate.

The term "integrated" may include a case where all the components of a circuit are formed on a semiconductor substrate or a case where major components of a circuit are integrated, and some resistors, capacitors, or the like may be installed outside the semiconductor substrate in order to adjust circuit constants.

According to another embodiment of the present disclosure, there is provided a touch panel input device. The input device includes: a touch panel; and one of the control circuits as described above, connected to the touch panel.

According to another embodiment of the present disclosure, there is provided an electronic device. The electronic device includes the touch panel input device as described above.

Further, arbitrarily combining the foregoing components or substituting the components or expressions of the present disclosure with one another among a method, an apparatus, and a system is also effective as an embodiment of the present disclosure.

BRIEF DESCRIPTION OF THE DRAWINGS

FIG. 10A is a circuit diagram of an impedance detection circuit according to a second modification.

DETAILED DESCRIPTION

Figure 1:
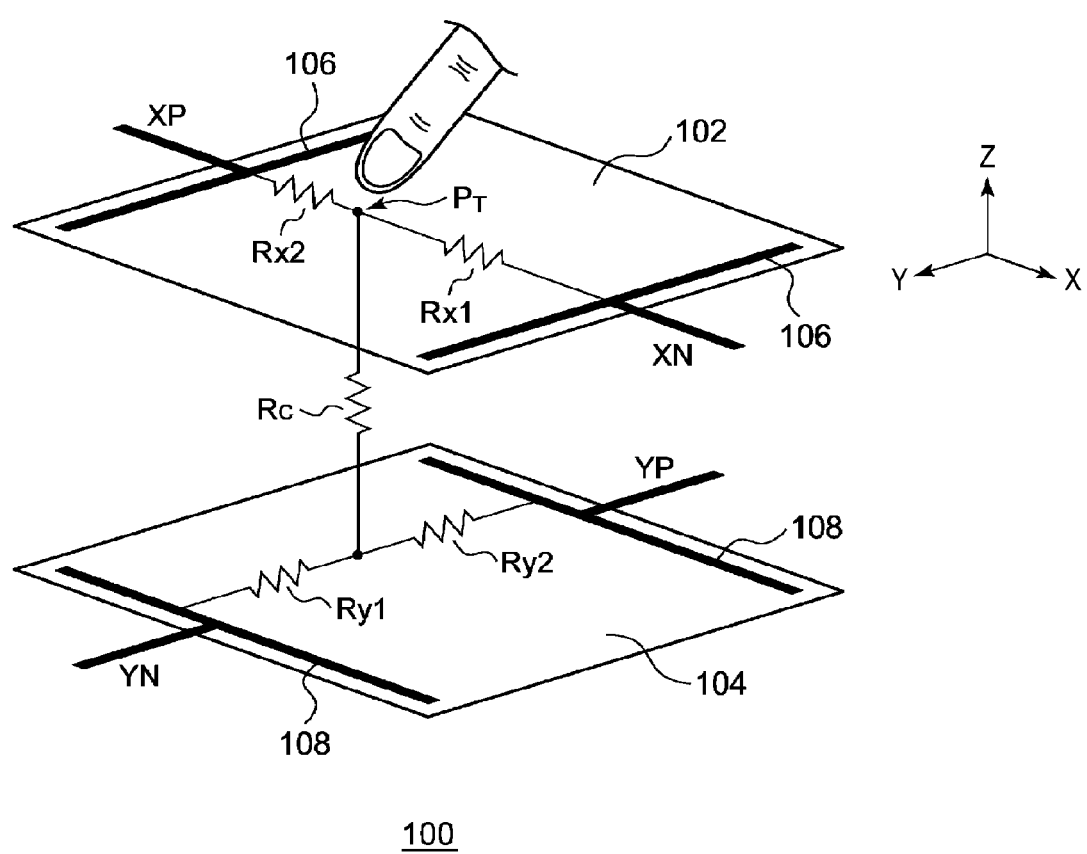
FIG. 1 schematically illustrates a resistive film type touch panel.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or a case where the member A and the member B are indirectly connected through any other member that does not affect an electrical connection state between the members A and B.

Similarly, "a state where a member C is installed between a member A and a member B" includes a case where the member A and the member C or the member B and the member C are indirectly connected through any other member that does not affect an electrical connection state between the members A and C or the members B and C, in addition to a case where the member A and the member C or the member B and the member C are directly connected.

Figure 2:
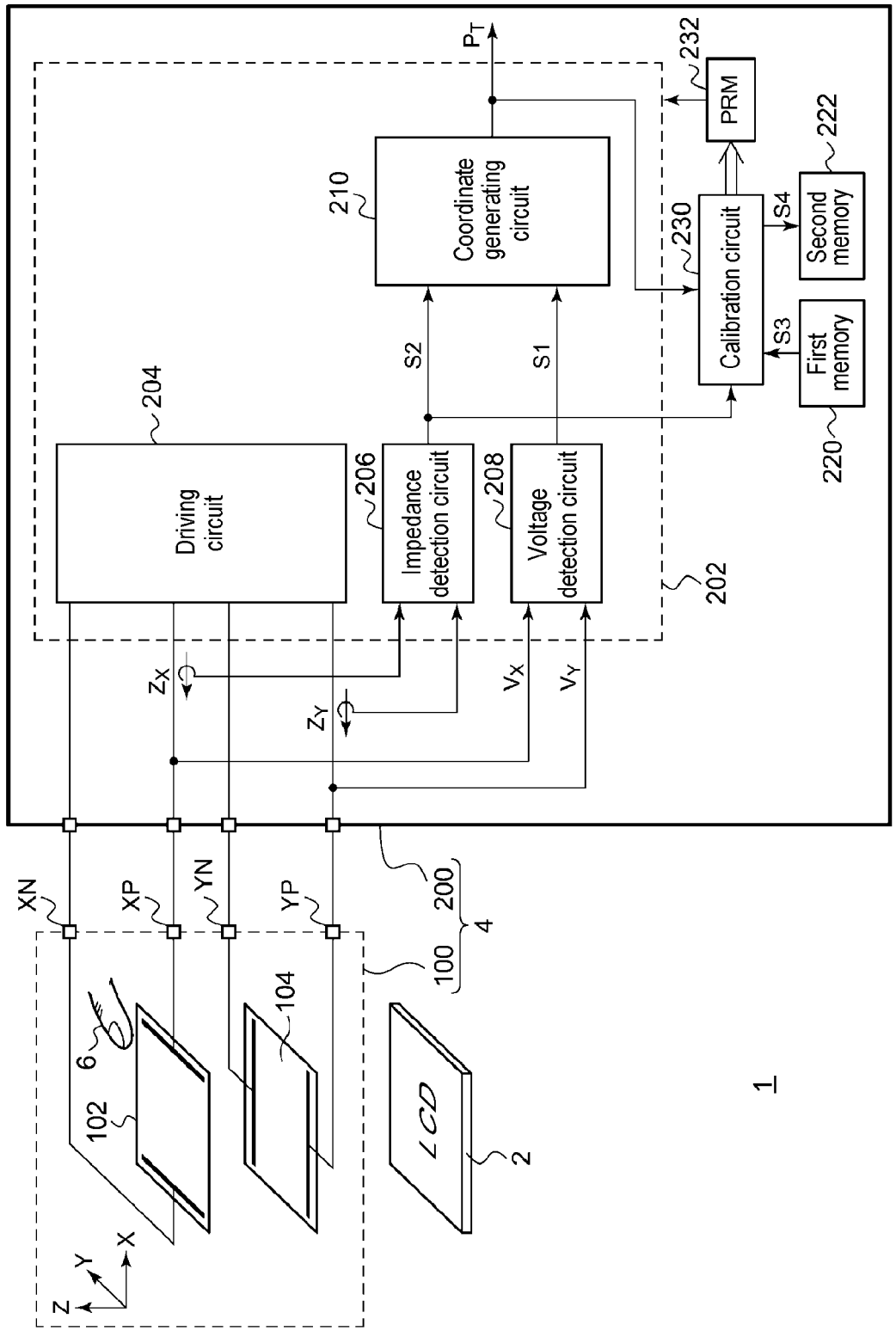
FIG. 2 is a block diagram of an electronic device having a touch panel input device according to an embodiment of the present disclosure.

FIG. 2 is a block diagram of an electronic device 1 having a touch panel input device 4 according to an embodiment of the present disclosure. The electronic device 1 is a smartphone, a tablet PC, a laptop computer, a portable audio player, a digital camera, a digital video camera, or the like, and includes a display panel 2 having a liquid crystal display (LCD) panel or an organic electroluminescence (EL) panel. The touch panel input device 4 is mounted on the electronic device 1 together with the display panel 2.

The touch panel input device 4 includes a touch panel 100 and a control circuit 200. The touch panel 100 is disposed on a surface layer of the display panel 2 and functions as a touch type input device. The touch panel input device 4 determines an X coordinate and a Y coordinate of a point touched by a user with a finger, a pen, or the like (hereinafter, referred to as a "finger 6"). The touch panel 100 is a four-line (four-terminal) resistive film type and its configuration is the same as described above with reference to FIG. 1.

The touch panel 100 has a first resistive film 102, a second resistive film 104, a first terminal XP, a second terminal XN, a third terminal YP, and a fourth terminal YN. The first resistive film 102 and the second resistive film 104 are disposed to overlap each other with a gap therebetween in a direction of the Z-axis perpendicular to the X-axis and the Y-axis. Two sides of the first resistive film 102 extending in a direction of the Y-axis are connected to the first terminal XP and the second terminal XN. Two sides of the second resistive film 104 extending in a direction of the X-axis are connected to the third terminal YP and the fourth terminal YN.

The touch panel input device 4 supports inputs of a single touch in which the user touches at one point and a two-point touch (or multi-touch) in which the user touches at two (or three or more) points. The control circuit 200 is connected to the first terminal XP to the fourth terminal YN of the touch panel input device 4 to detect an X coordinate and a Y coordinate of a point touched by the user.

The control circuit 200 is a functional integrated circuit (IC) integrated on a single semiconductor substrate. The control circuit 200 includes a coordinate detection circuit 202, a first memory 220, a second memory 222, a calibration circuit 230, and a register 232.

The coordinate detection circuit 202 applies an appropriate electrical signal to the touch panel 100, and detects coordinates based on an electrical change occurring in the touch panel 100 based on presence or absence of a touch and touched coordinates. The coordinate detection circuit 202 mainly operates in the following four modes:

φ1: Single touch (one-point touch), X coordinate detection mode
φ2: Single touch, Y coordinate detection mode
φ3: 2-point touch, X coordinate detection mode
φ4: 2-point touch, Y coordinate detection mode The coordinate detection circuit 202 includes a driving circuit 204, an impedance detection circuit 206, a voltage detection circuit 208, and a coordinate generating circuit 210.

Figure 3:
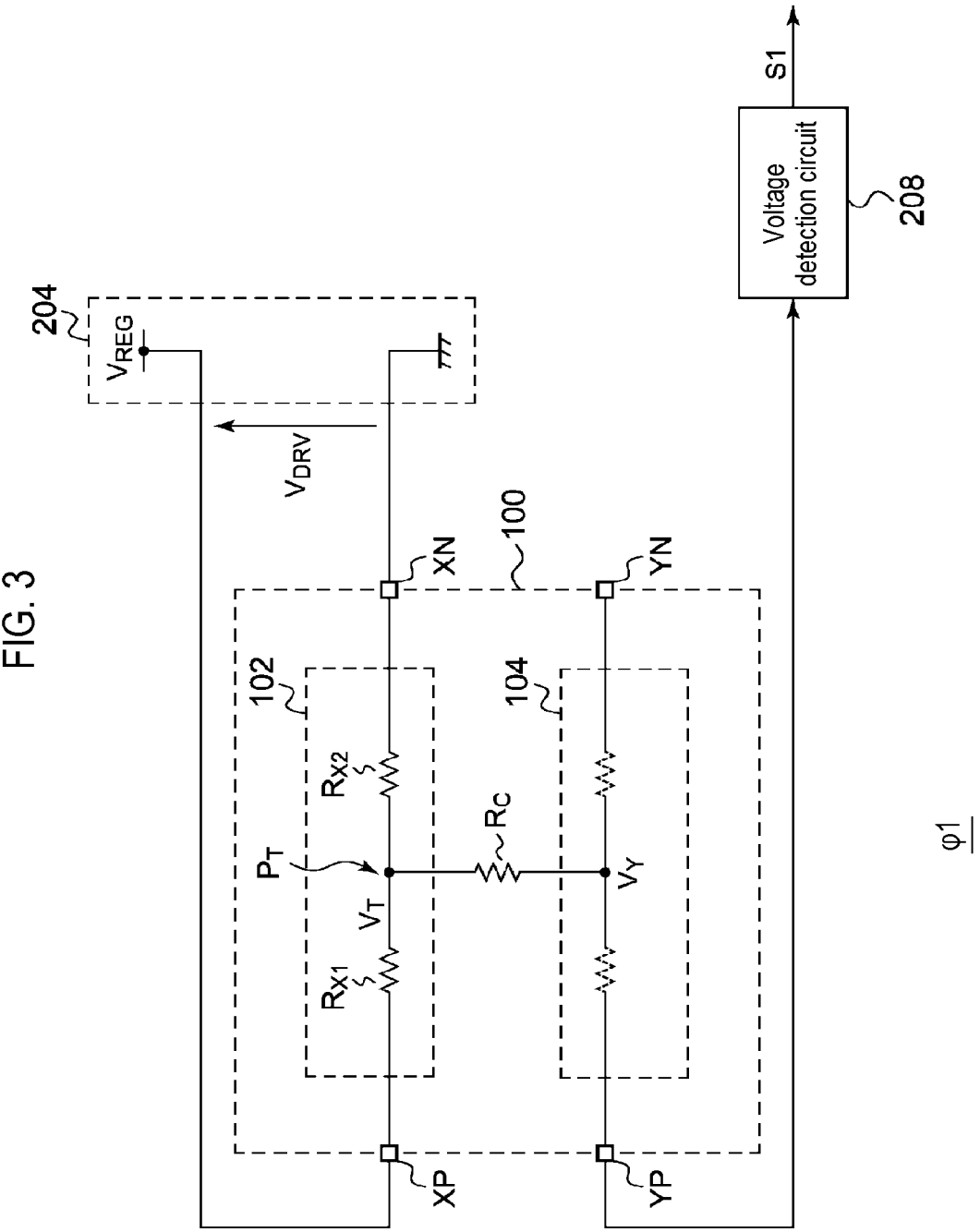
FIG. 3 is a diagram illustrating a principle of detecting an X coordinate when a single touch occurs.

FIG. 3 is a diagram illustrating a principle of detecting an X coordinate when a single touch occurs. In the mode φ1, the driving circuit 204 applies a driving voltage (bias voltage) $V_{DRV}$ between the first terminal XP and the second terminal XN. For example, the driving circuit 204 may apply a constant voltage $V_{REG}$ equivalent (or substantially equivalent) to the driving voltage $V_{DRV}$ to the first terminal XP, and ground the second terminal XN.

In this state, when the user touches a specific coordinate $P_T$ at one point, an electric potential $V_T$ of the coordinate $P_T$ is given as Eq. (1).

$$V_T = V_{REG} \times R_{X2}/(R_{X1}+R_{X2}) = V_{REG} \times R_{X2}/R_X \quad (1)$$

where $R_X = R_{X1} + R_{X2}$ denotes impedance between the first terminal XP and the second terminal XN when not touched, i.e., $R_X = R_{X1} + R_{X2}$ indicates a resistance value of the first resistive film 102 when not touched. $R_{X2}$ corresponds to a distance between XN and $P_T$ and when X=0 in the second terminal XN, $R_{X2}$ is proportional to the X coordinate (distance X from XN). When the distance between XP and XN is $X_{MAX}$, following Eq. (2) is represented.

$$R_{X2} = R_X/X_{MAX} \times X \quad (2)$$

By substituting Eq. (2) into Eq. (1), following Eq. (3) is obtained.

$$V_T = V_{REG} \times X/X_{MAX} \quad (3)$$

As such, when the point $P_T$ is touched, the electric potential $V_T$ of the point $P_T$ indicates the X coordinate.

In the mode φ1, the third terminal YP and the fourth terminal YN is set to be high impedance. Thus, no current flows through the second resistive film 104 and the contact resistance $R_C$, the electric potential difference there becomes zero, and the electric potential $V_T$ of the point $P_T$ appears at the third terminal YP and the fourth terminal YN. The voltage detection circuit 208 measures a voltage $V_Y(=V_T)$ of the third terminal YP (or the fourth terminal YN) and generates a voltage detection signal S1 indicative of the voltage $V_Y$. The coordinate generating circuit 210 generates an X coordinate of the point $P_T$ based on the voltage detection signal S1 (voltage $V_Y$).

In the mode φ2, a Y coordinate of the point $P_T$ is detected by replacing the first resistive film 102 and the second resistive film 104 as conducting the same measurement. Specifically, the driving circuit 204 applies a driving voltage $V_{DRV}$ between the third terminal YP and the fourth terminal YN, and the voltage detection circuit 208 measures a voltage $V_X$ of the first terminal XP (or the fourth terminal YN) at that time. The coordinate generating circuit 210 generates a Y coordinate of the point $P_T$ based on the voltage detection signal S1 (voltage $V_X$).

Figure 4:
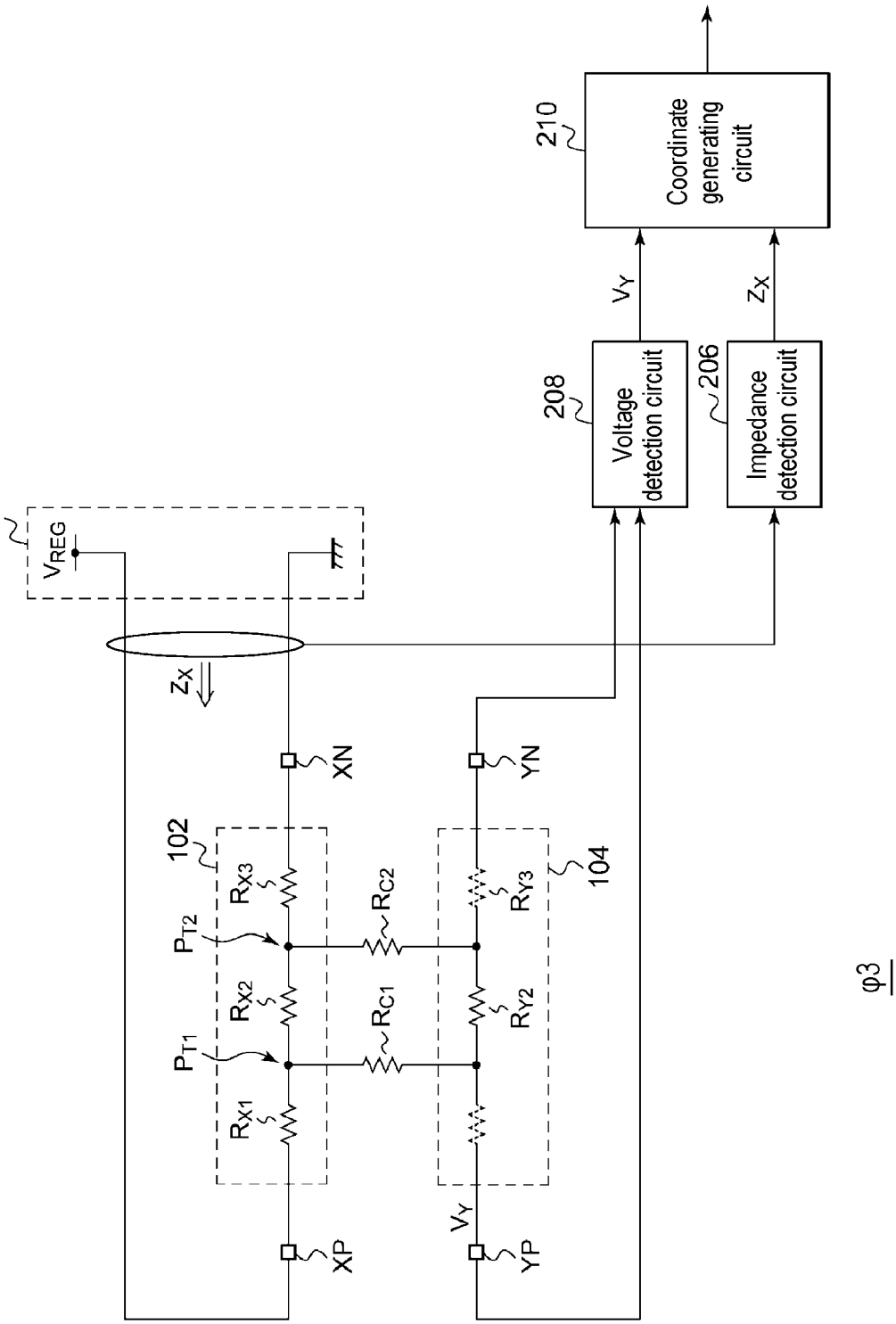
FIG. 4 is a diagram illustrating a principle of detecting an X coordinate when a two-point touch occurs.

FIG. 4 is a diagram illustrating a principle of detecting an X coordinate when a two-point touch occurs. In the mode φ3, similar to the mode φ1, the driving circuit 204 applies a driving voltage $V_{DRV}$ between the first terminal XP and the second terminal XN. Also in the mode φ3, the third terminal YP and the fourth terminal YN is set to be high impedance, and the voltage detection circuit 208 measures a voltage $V_Y$ of the third terminal YP (and/or the fourth terminal YN) and generates a voltage detection signal S1.

In this state, when the user touches two points $P_{T1}$ and $P_{T2}$, the voltage $V_Y$ has an electric potential corresponding to the two points $P_{T1}$ and $P_{T2}$. For example, the voltage $V_Y$ may indicate a middle point between the two points $P_{T1}$ and $P_{T2}$.

The impedance detection circuit 206 generates an impedance detection signal S2 indicative of impedance $Z_X$ between the first terminal XP and the second terminal XN. This impedance $Z_X$ is given as Eq. (4).

$$Z_X = R_{X1} + R_{X3} + R_{X2}//(R_{C1} + R_{Y2} + R_{C2}) \quad (4)$$

$R_{X2}$ is a resistance value of the first resistive film 102 between the two points $P_{T1}$ and $P_{T2}$, and $R_{Y2}$ is a resistance value of the resistive film 104 between the two points $P_{T1}$ and $P_{T2}$. The above values change depending on a distance between the two points $P_{T1}$ and $P_{T2}$. The symbol "//" indicated in Eq. (4) denotes combined impedance of the two parallel resistors. The voltage detection circuit 208 generates X coordinates (i.e., $X_1$ and $X_2$) of the two points $P_{T1}$ and $P_{T2}$ based on the voltage detection signal S1 (voltage $V_Y$) and the impedance detection signal S2 (impedance $Z_X$).

In the mode φ4, Y coordinates of the two points $P_{T1}$ and $P_{T2}$ are detected by replacing the first resistive film 102 and the second resistive film 104 as conducting the same measurement. Specifically, the driving circuit 204 applies a driving voltage $V_{DRV}$ between the third terminal YP and the fourth terminal YN. The voltage detection circuit 208 measures a voltage $V_X$ of the first terminal XP (or the fourth terminal YN) at that time, and the impedance detection circuit 206 measures impedance $Z_Y$ between the third terminal YP and the fourth terminal YN. The coordinate generating circuit 210 generates Y coordinates (i.e., $Y_1$ and $Y_2$) of the two points $P_{T1}$ and $P_{T2}$ based on the voltage detection signal S1 (voltage $V_X$) and the impedance detection signal S2 (impedance $Z_Y$).

Further, the impedance detection circuit 206 may detect a current (referred to as a panel current) $I_P$ flowing through the touch panel 100 in the modes φ3 and φ4. When the driving voltage $V_{DRV}$ is applied between both ends of a current path formed in the touch panel 100 by the driving circuit 204, the panel current $I_P$ is given as $I_P = V_{DRV}/Z$. When the driving voltage $V_{DRV}$ has a constant value, the panel current $I_P$ corresponds to impedance of the panel in a one-to-one manner and, thus, it can be said that measuring the panel current $I_P$ is equivalent (or substantially equivalent) to measuring conductance, i.e., a reciprocal of impedance, and the impedance detection signal S2 indicative of the panel current indicates impedance of the panel.

Aged deterioration of the touch panel 100 is described below. Due to the aged deterioration, a resistance value $R_X$ of the first resistive film 102, a resistance value $R_Y$ of the second resistive film 104, and the contact resistance $R_C$ may change.

As expressed by Eq. (3), the X coordinate for a one-point touch is given as $V_{REG} \times X/X_{MAX}$ and is dependent upon neither the resistance value $R_X$ of the first resistive film 102 nor the contact resistance $R_C$. Thus, the coordinate X detected by the one-point touch may not be substantially affected by the aged deterioration. This may also be applied to the Y coordinate.

On the other hand, the X coordinates $X_1$ and $X_2$ for a two-point touch are calculated based on the impedance $Z_X$ of Eq. (4). The impedance $Z_X$ is dependent upon the contact resistances $R_{C1}$ and $R_{C2}$, and also dependent upon the resistance value $R_X$ of the first resistive film 102 and the resistance value $R_Y$ of the second resistive film 104. That is, the X coordinates $X_1$ and $X_2$ for the two-point touch are significantly affected by the aged deterioration of the touch panel 100. This may be also applied to the Y coordinates $Y_1$ and $Y_2$ for a two-point touch.

The calibration for the aged deterioration of the touch panel is described below. With reference to FIG. 2, in order to calibrate the influence of the aged deterioration of the touch panel 100, the control circuit 200 includes a first memory 220, a second memory 222, and a calibration circuit 230.

In an initial state, an impedance of at least one predetermined path (M number of paths, where M is a natural number) of the touch panel is measured in advance. The impedance may be detected by the impedance detection circuit 206. That is to say, the impedance detection circuit 206 is configured to be capable of measuring not only an impedance of a path used for coordinate detection, but also an impedance of each of the M number of paths used for calibration.

In the initial state, the first memory 220 non-volatilely stores initial data S3 corresponding to the impedances of the M number of paths measured. Further, the first memory 220 may be embedded in the control circuit 200 or may be externally attached.

The initial data S3 may include (i) a value of each of impedances of the M number of paths, (ii) an average value (including a simple average and a weighted average) of impedances of the M number of paths, or (iii) a value obtained by calculating the impedances of the M number of paths by using a predetermined arithmetic expression (function).

While in use (i.e., in an operation state), the calibration circuit 230 obtains the impedances of the M number of paths and stores detection data corresponding to the impedances of the M number of paths in the second memory 222. The calibration circuit 230 calibrates the coordinate detection circuit 202 based on detection data S4 stored in the second memory 222 and the initial data S3.

The foregoing is a basic configuration of the control circuit 200 and its operation is described below. Here, the case that the number of the paths is 1 (i.e., M=1) is considered for ease of comprehension and simplification of explanation.

In the initial state, for example, before the electronic device 1 is released, an electrical signal is measured based on the impedance of one predetermined path of the touch panel 100, and the initial data S3 corresponding to the impedance is stored in the first memory 220. Further, it is possible that the initial state is a stage in which the user initially sets up the electronic device 1 after the electronic device 1 is released.

Since the user uses the electronic device 1 for a long period of time, the aged deterioration occurs in the touch panel 100. Due to the aged deterioration, impedance of the touch panel 100, for example, the resistance value $R_X$ of the first resistive film 102, the resistance value $R_Y$ of the second resistive film 104, and the contact resistance $R_C$ of the touch panel 100, may be changed. Due to the aged deterioration, the impedance of the predetermined path may also be changed.

While in use (i.e., in an operation state), the calibration circuit 230 obtains the impedance of the predetermined path. The impedance measured in this manner is affected by the aged deterioration. The calibration circuit 230 generates the detection data S4 corresponding to the impedance of the predetermined path, and calibrates the coordinate detection circuit 202 based on at least the detection data S4.

Each of a method for calibration and a configuration for calibration is not particularly limited. The coordinate detection circuit 202 calculates coordinates based on the known resistance values $R_X$, $R_Y$, and $R_C$ of the touch panel 100. Since the detection data S4 is based on the resistance values $R_X$, $R_Y$, and $R_C$ after a change, the coordinate detection circuit 202 may be corrected to an appropriate state for the touch panel 100 after the change as the detection data S4 is used. The calibration may also reflect the initial data S3, in addition to the detection data S4.

As described above, according to the control circuit 200, it is possible to suppress degradation of coordinate detection accuracy due to the aged deterioration of the touch panel 100 by calibrating the coordinate detection circuit 202 as necessary.

The present disclosure is recognized by the block diagram or the circuit diagram of FIG. 2 or intended to cover various devices and circuits derived from the above description, but is not limited to the specific configuration. Hereinafter, a more specific configuration example or embodiment will be described in order to help understand and clarify the gist of the present disclosure and a circuit operation thereof, rather than to narrow the scope of the present disclosure.

Figure 5:
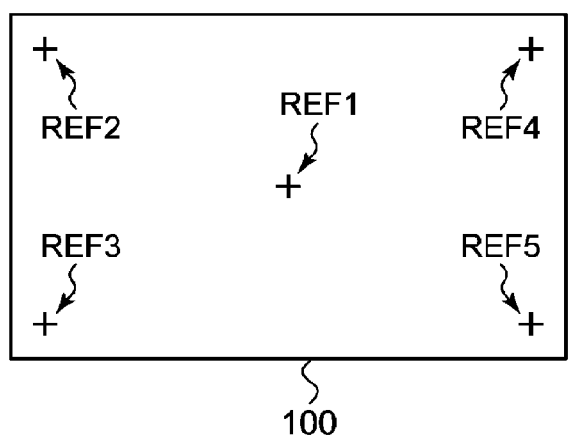
FIG. 5 is a diagram illustrating a reference point.

In a preferred embodiment, at least one reference point REF (N number of reference points, where N is a natural number) is defined on the touch panel 100. The reference point REF is a virtual point, which is not necessarily required to be recognizable by a user. FIG. 5 is a diagram illustrating such a reference point. In FIG. 5, five reference points REF1 to REF5 are illustrated. Further, the number N of the reference points REFs is an arbitrary number, regardless of singularity or plurality.

Among the M number of paths that are measuring objects of the calibration circuit 230, N number of paths correspond to N number of reference points REFs. An i-th (where 1≤i≤N) path is a path from one side (e.g., XP) of the first terminal XP and the second terminal XN to one side (e.g., YN) of the third terminal YP and the fourth terminal YN when a corresponding reference point REFi is one-point touched.

(N=1)

Hereinafter, first, the case of one reference point REF is described for ease of comprehension and simplification of explanation. The reference point REF is determined to be a position where the number of times the user touches statistically is larger than other points. For example, in the cases where a home button, a back button, or the like is implemented as a software button (e.g., on-screen button) in a smartphone or a tablet PC, a position of the button may be determined as a reference point REF. As will be described hereinbelow, in the case of N≥2, some reference points may be defined in the same manner.

Figure 6:
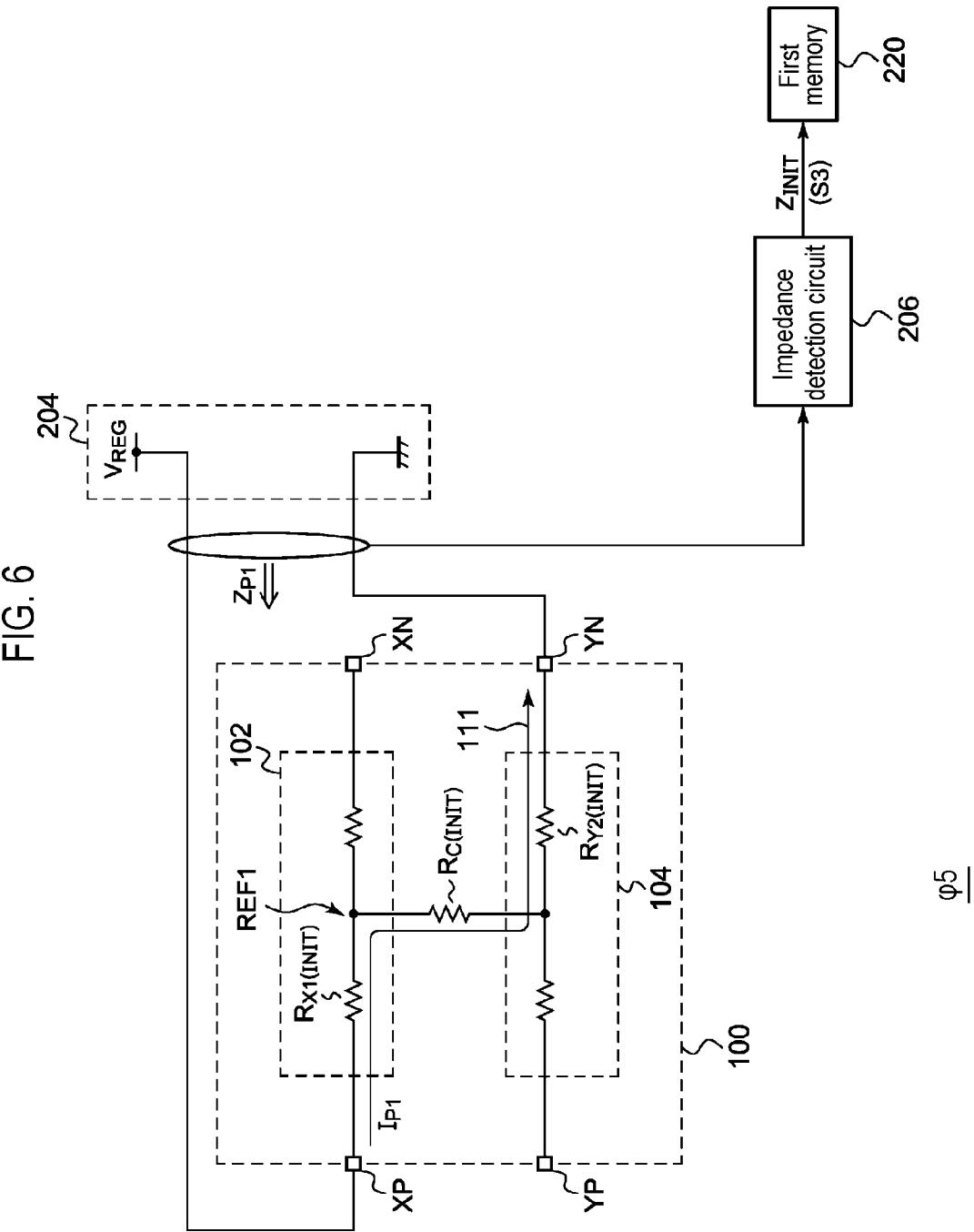
FIG. 6 is a diagram illustrating measurement of initial data in an initial state $\varphi 5$.

FIG. 6 is a diagram illustrating measurement of initial data of the initial state φ5. In a predetermined path 111, in a state in which the reference point REF1 is one-point touched, the contact resistance $R_C$ is positioned at the reference point REF1 on the way covering from the first terminal XP to the fourth terminal YN.

$$Z_P = R_{X1} + R_C + R_{Y2} \quad (5)$$

where $R_{X1}$ is a resistance value between XP and REF of the first resistive film 102, $R_C$ is a contact resistance, and $R_{Y2}$ is a resistance value between YN and REF of the second resistive film 104.

Initial impedance $Z_{P1(INIT)}$ measured in the initial state is expressed by following Eq. (6).

$$Z_{P1(INIT)} = R_{X1(INIT)} + R_{C(INIT)} + R_{Y2(INIT)} \quad (6)$$

where $R_{X1(INIT)}$ is an initial value before the aged deterioration of the resistance value $R_{X1}$, $R_{C(INIT)}$ is an initial value before the aged deterioration of the contact resistance $R_C$, and $R_{Y2(INIT)}$ is an initial value before the aged deterioration of the resistance value $R_{Y2}$.

The panel impedance $Z_{P1}$ of the touch panel 100 is measured by the impedance detection circuit 206. For example, in the initial state φ5, the driving circuit 204 may apply a predetermined voltage $V_{REG}$ between XP and YN. The impedance detection circuit 206 may measure a panel current $I_P$ flowing between XP and YN. The panel current $I_P$ measured in this manner is proportional to conductance, i.e., a reciprocal of the panel impedance $Z_{P1}$ and, thus, represents the panel impedance $Z_{P1}$.

While the control circuit 200 (electronic device 1) normally operates (when used) after it is released, the calibration circuit 230 monitors coordinates detected by the coordinate detection circuit 202. Further, when the coordinate detection circuit 202 detects a one-point touch and its coordinates correspond to the reference point REF1, the calibration circuit 230 stores the detection data S4 representing the panel impedance $Z_{P1}$ of the touch panel 100 at that time in the second memory 222.

Figure 7:
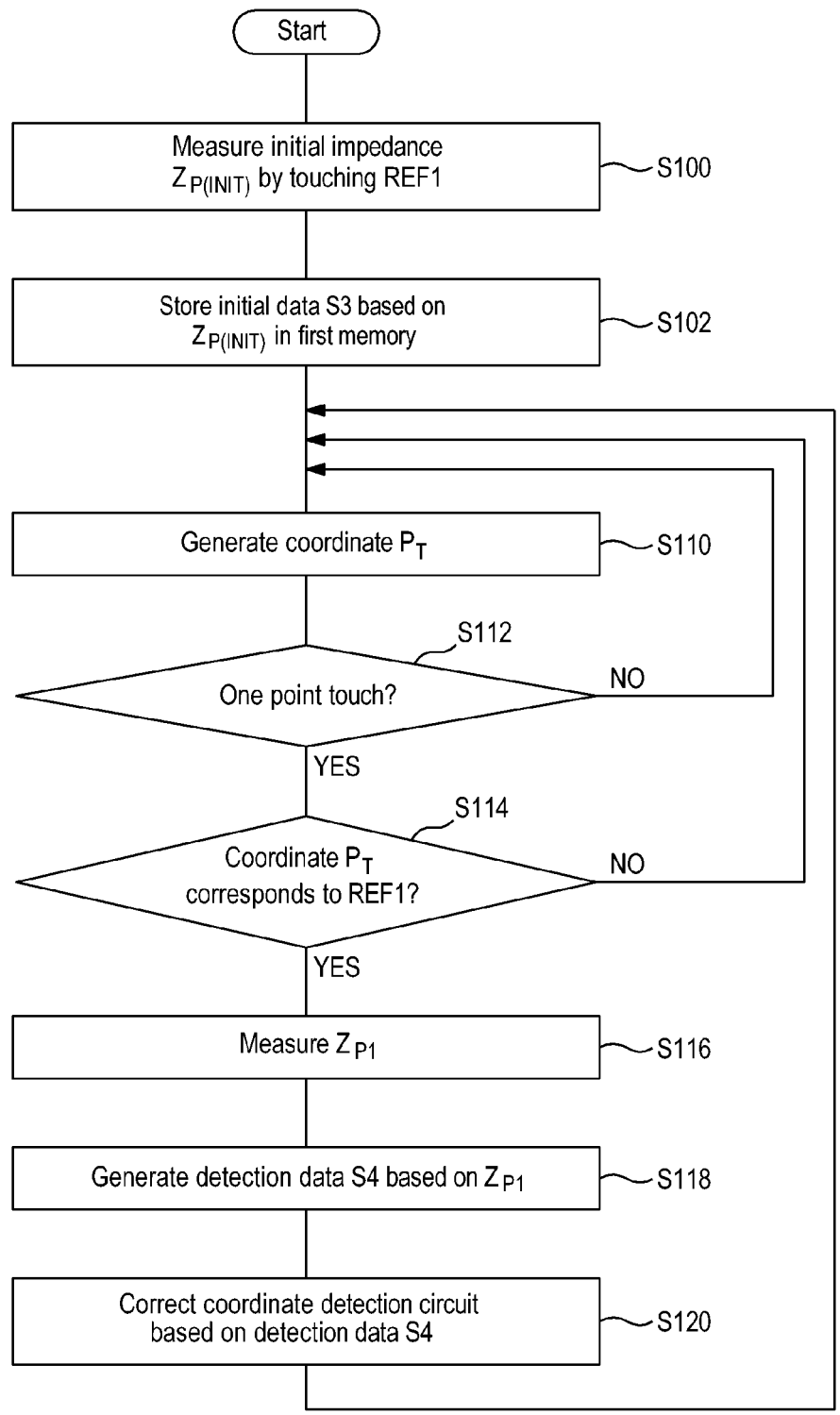
FIG. 7 is a flowchart of calibration in the case of N=1.

FIG. 7 is a flowchart of calibration in the case of N=1. In the initial state φ5, when the reference point REF1 is one-point touched, impedance (referred to as panel impedance) $Z_{P1}$ of the predetermined path 111 of the touch panel 100 is measured in advance (S100). Initial data S3 corresponding to the measured panel impedance $Z_{P(INIT)}$ is nonvolatilely stored in the first memory 220 (S102).

Step S110 and subsequent steps correspond to a usage state. While in use (i.e., in an operation state), the control circuit 200 generates coordinates $P_T$ touched by the user (S110). When the coordinates PT are not one-point touched (when the coordinates PT are two-point touched) (N of S112), the process returns to step S110. When the coordinates $P_T$ are one-point touched (Y of S112), it is determined whether the coordinates $P_T$ correspond to the reference point REF1 (S114). At step S114, it is determined whether the coordinates $P_T$ are included in a predetermined area including the reference point REF1. Further, when the coordinates $P_T$ do not correspond to the reference point REF1 (N of S114), the process returns to step S110. When the coordinates $P_T$ correspond to the reference point REF1 (Y of S114), panel impedance (i.e., impedance of predetermined path 111) $Z_{P1}$ at that time is measured (S116) and detection data S4 is generated (S118).

Thereafter, the coordinate detection circuit 202 is calibrated based on the detection data S4 (S120). When a difference ($=Z_P - Z_{P(INIT)}$) between the initial impedance $Z_{P(INIT)}$ represented by the initial data S3 and current panel impedance $Z_P$ represented by the detection data S4 stored in the second memory 222 is greater than a first threshold value and smaller than a second threshold value, the calibration circuit 230 may calibrate the coordinate detection circuit 202. When a variation of the panel impedance $Z_P$ is smaller than the first threshold value, since the aged deterioration does not affect the accuracy of coordinate detection, it is desirable that the calibration be not performed. Conversely, when a variation of the panel impedance $Z_P$ is greater than the second threshold value equivalent (or substantially equivalent) to an upper limit of an addressed range, since there is a high possibility that the panel impedance $Z_P$ is erroneously detected due to noise, by not performing the calibration, it is possible to prevent degradation of detection rather due to the calibration. Thereafter, the process returns to step S110.

(N≥2)

Figure 8:
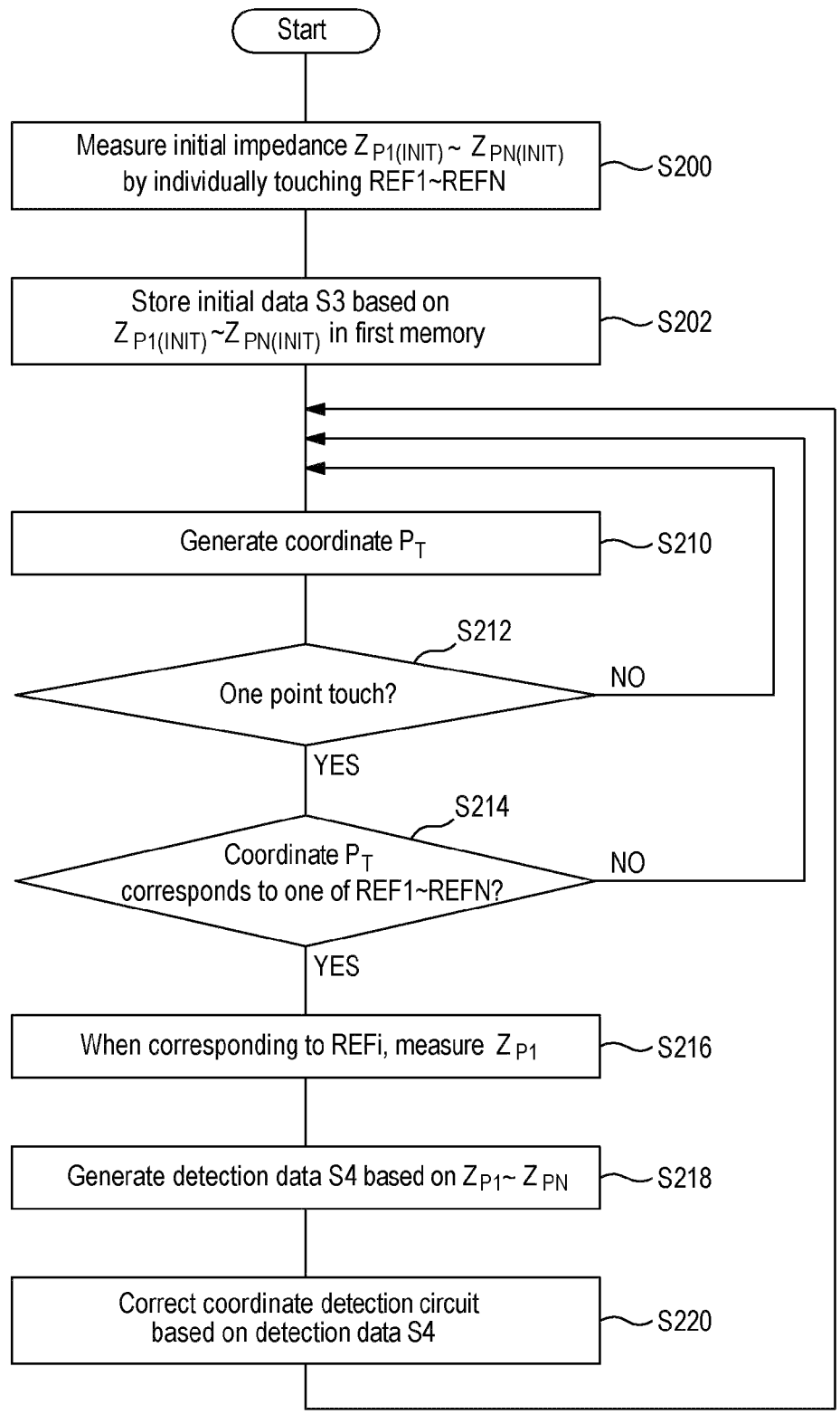
FIG. 8 is a flowchart of calibration in the case of N≥2.

Next, the case of N≥2 is described. In this case, N number of reference points REF1 to REFN are defined and N number of paths 111 to 11N corresponding thereto are defined. FIG. 8 is a flowchart of calibration in the case of N≥2.

In the initial state φ5, panel impedance $Z_{P1(INIT)}$ of the path 111 is measured, and the path 111 is formed in a state in which the reference point REF1 is touched. Panel impedances $Z_{P2(INIT)}$ to $Z_{PN(INIT)}$ are also measured for the respective paths 112 to 115 corresponding to the reference points REF2 to REF5 (S200).

Thereafter, initial data S3 corresponding to the measured N number of panel impedances $Z_{P1(INIT)}$ to $Z_{PN(INIT)}$ is generated and then it is stored in the first memory (S202). The initial data S3 may include a simple average value of the panel impedances $Z_{P1(INIT)}$ to $Z_{PN(INIT)}$.

Step 210 and subsequent steps correspond to a usage state. While in use (i.e., in an operation state), the control circuit 200 generates coordinates $P_t$ touched by the user (S210). When the coordinates P are not one-point touched (when the coordinates $P_t$ are two-point touched) (N of S212), the process returns to step S210. When the coordinates $P_t$ are one-point touched (Y of S212), it is determined whether the coordinates $P_t$ correspond to any one of the reference points REF1 to REFN (S214).

At step S214, it is determined whether the coordinates $P_t$ correspond to any one of the reference points REF1 to REFN. Further, when the coordinates $P_t$ do not correspond to any one of the reference points REF1 to REFN (N of S214), the process returns to step S210. When the coordinates $P_t$ correspond to the i-th reference point REFi (Y of S214, S216), panel impedance (i.e., impedance of predetermined path 11i) $Z_{Pi}$ at that time is measured. Thereafter, detection data S4 corresponding to the impedances $Z_{P1}$ to $Z_{PN}$ is generated (S218). The detection data S4 corresponds to the initial data S3, and a relationship between a plurality of initial impedances $Z_{P(INIT)}$ and the initial data S3 is the same as a relationship between a plurality of impedances $Z_P$ and the detection data S4. Thus, when the initial data S3 is a simple average of the plurality of initial impedances, the detection data S4 is also a simple average of the plurality of impedances $Z_P$.

Further, by measuring impedance of the same path for a plurality of times, an average of the plurality of measurement values may be used as the impedance of the path. Thus, it is possible to improve the precision.

For example, the initial data S3 and the detection data S4 may be average values of N number of impedances, respectively. In this case, after the measurement of N number of impedances $Z_{P1}$ to $Z_{PN}$ is completed, the detection data S4 may be generated. Otherwise, the detection data S4 may be an average value of K number of impedances (where K<N). In this case, after the measurement of the K number of impedances is completed, the detection data S4 may be generated.

Thereafter, the coordinate detection circuit 202 is calibrated based on the detection data S4 (S220). The calibration is the same as step S120 of FIG. 7. Subsequently, the process returns to step S210.

By defining the reference point REF a plurality of times, it is possible to calibrate the coordinate detection circuit 202 in consideration of deterioration of multi-point contact resistance of the touch panel 100, and to further improve the precision of coordinate detection.

Next, a specific example of calibration by the calibration circuit 230 is described.

Referring back to FIG. 2, the coordinate detection circuit 202 performs generation of coordinates based on a control parameter PRM of a register 232 when detecting coordinates. An initial value of the control parameter PRM is defined based on the initial impedance $Z_{P(INIT)}$.

The calibration circuit 230 may update the control parameter PRM stored in the register 232 based on the detection data S4 representing the current panel impedance $Z_P$. The calibration circuit 230 may calculate the control parameter PRM corresponding to the detection data S4 according to a predetermined arithmetic expression, or may generate the control parameter PRM corresponding to the detection data S4 according to a table reference. Thus, it is possible to calibrate the operation of the coordinate detection circuit 212.

Figure 9:
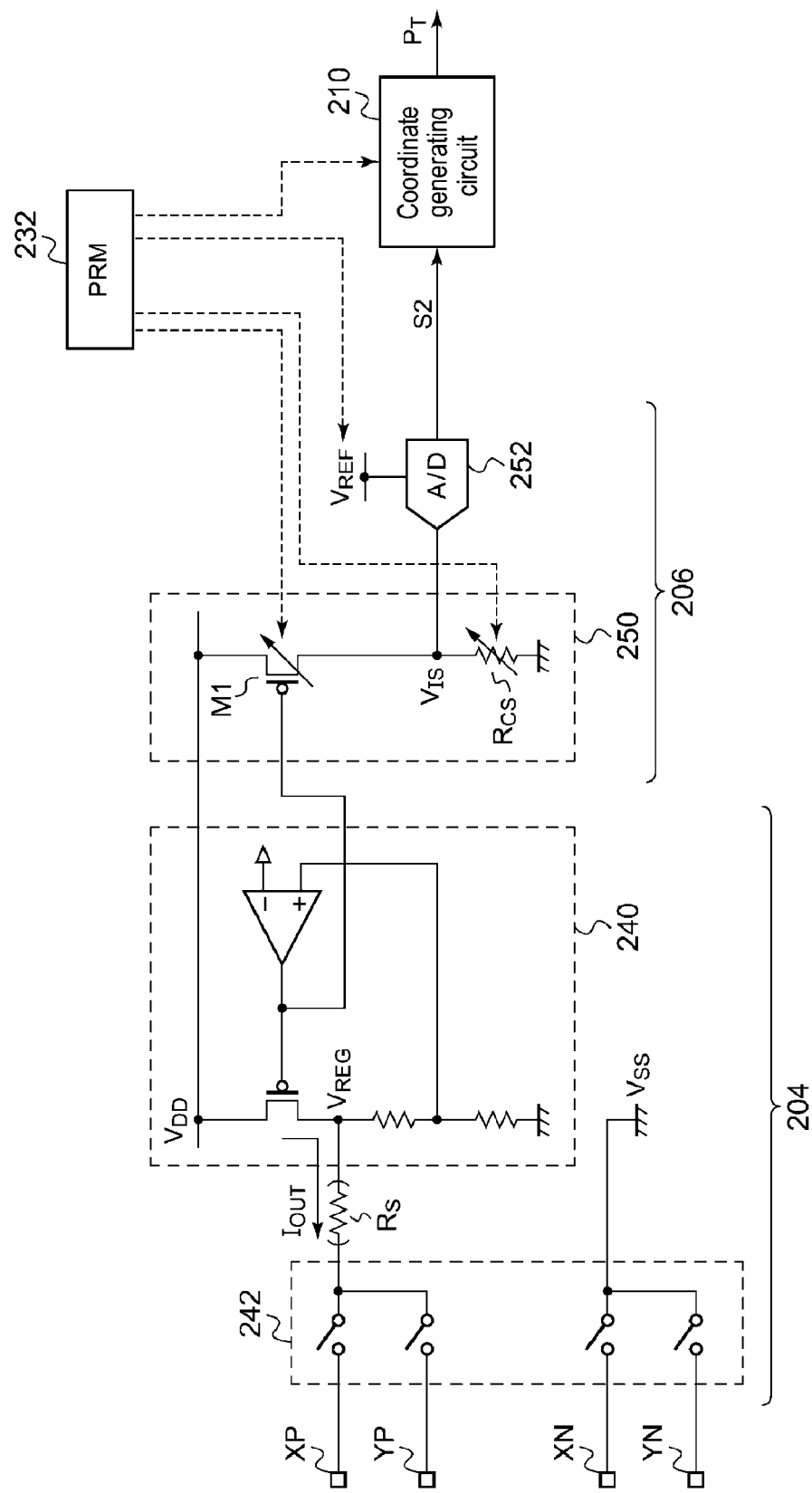
FIG. 9 is a circuit diagram illustrating a configuration example of a part of a control circuit.

FIG. 9 is a circuit diagram illustrating a partial configuration example of part of the control circuit 200.

The driving circuit 204 includes a voltage regulator 240 and a switch matrix 242. The voltage regulator 240 is, for example, a linear regulator, and stabilizes a voltage $V_{REG}$ equivalent (or substantially equivalent) to the driving voltage $V_{DRV}$. The switch matrix 242 supplies the voltage $V_{REG}$ to one side of each of the first terminal XP and the third terminal YP. Further, the switch matrix 242 supplies a ground voltage $V_{SS}$ to one side of each of the second terminal XN and the fourth terminal YN.

The impedance detection circuit 206 is a current detection circuit and detects an output current $I_{OUT}$, i.e., the panel current $I_P$, of the voltage regulator 240. The impedance detection circuit 206 includes an I/V conversion circuit 250 and an A/D converter 252. The I/V conversion circuit 250 converts an output current of the voltage regulator 240 into a voltage $V_{IS}$. For example, the I/V conversion circuit 250 includes a replica transistor M1, whose gate and source are connected to those of an output transistor of the voltage regulator 240 respectively corresponding thereto, and a sense resistor $R_{CS}$ installed in a path of the replica transistor M1. The voltage drop $V_{IS}$ of the sense resistor $R_{CS}$ is proportional to the output current $I_{OUT}$ of the voltage regulator 240, and thus, it is inverse-proportional to the impedance of the panel. The A/D converter 252 converts the voltage drop $V_{IS}$ into a digital impedance detection signal S2.

The calibration circuit 230 may correct scaling of the impedance detection circuit 206. An influence of the aged deterioration can be removed by correcting scaling, i.e., a relationship between an actual resistance value and a measured resistance value (impedance detection signal S2).

For example, the calibration circuit 230 may correct a conversion gain of the I/V conversion circuit 250 depending on the detection data S4. Regarding the I/V conversion circuit 250 of FIG. 9, an effective size (operation area) of the replica transistor M1 may be variable depending on the detection data S4. Otherwise, the resistance value of the sense resistor $R_{CS}$ may be variable depending on the detection data S4. Otherwise, the reference voltage $V_{REF}$ to the A/D converter 252 may be variable depending on the detection data S4. In the register 232, data for designating at least one of the size of the replica transistor M1, the resistance value of the sense resistor $R_{CS}$, and the reference voltage $V_{REF}$ to the A/D converter 252 is stored as the control parameter PRM.

Alternatively, the calibration circuit 230 may correct an output of the A/D converter 252, i.e., the impedance detection signal S2 generated by the impedance detection circuit 206. In other words, the calibration circuit 230 may correct calculation processing of the coordinate generating circuit 210.

The present disclosure has been described above based on the embodiment. It is to be understood by a person skilled in the art that the embodiment is merely illustrative and may be differently modified by any combination of the components or processes, and the modifications are also within the scope of the present disclosure. Hereinafter, these modifications will be described.

First Modification

The calibration circuit 230, while in use (i.e., in an operation state), may update the initial data S3 of the first memory 220 based on the generated detection data S4. The touch panel 100, in which the aged deterioration has been in progress, is used with low accuracy of coordinate detection until the calibration by the calibration circuit 230 is completed. In this connection, by upgrading the initial data S3, it is possible to improve the accuracy of coordinate detection, immediately after the control circuit 200 starts up, although the touch panel 100 is deteriorated.

Second Modification

A configuration of the impedance detection circuit 206 is not particularly limited. For example, the impedance detection circuit 206 may include the sense resistor $R_S$ installed in the path of an output current of the voltage regulator 240 as illustrated in FIG. 9, and detect a voltage drop of the sense resistor $R_S$.

Figure 10B:
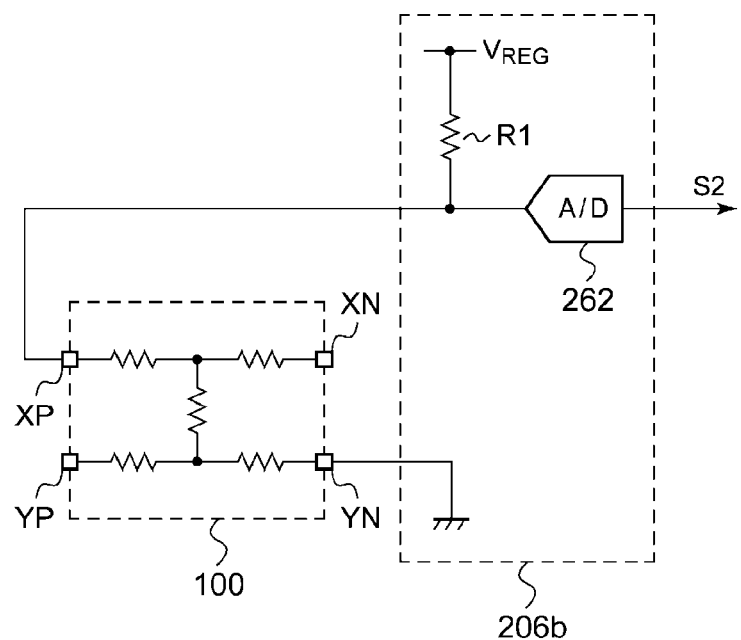
FIG. 10B is a circuit diagram of another impedance detection circuit according to the second modification.

Alternatively, in this embodiment, the impedance detection circuits 206a or 206b measure the panel current $I_P$ of the touch panel 100, but the present disclosure is not limited thereto. FIGS. 10A and 10B depict circuit diagrams of the impedance detection circuits 206a and 206b, respectively, according to a second modification. An impedance detection circuit 206a of FIG. 10A includes a current source 260 and an A/D converter 262. The current source 260 supplies a constant current $I_C$ to the touch panel 100. Accordingly, a voltage drop (voltage between terminals) $V_S$ proportional to impedance $Z_P$ occurs between the terminals XP and YN of the touch panel 100. The A/D converter 262 converts the voltage $V_S$ between the terminals into a digital impedance detection signal S2. In this modification, the constant current $I_C$ may be variable or the reference voltage $V_{REF}$ of the A/D converter 262 may be variable, depending on the detection data S4.

An impedance detection circuit 206b of FIG. 10B includes a resistor R1 and an A/D converter 264. A voltage $V_{REG}$ is applied to the touch panel 100 via the resistor R1. The voltage drop $V_S$ occurs in the touch panel 100.

$$V_S = V_{REF} \times Z_P / (R1 + Z_P)$$

The A/D converter 262 converts the voltage drop $V_S$ into digital impedance detection signal S2. In this modification, the voltage $V_{REG}$ may be variable, the reference voltage $V_{REF}$ of the A/D converter 262 may be variable, and the resistor R1 may be variable, depending on the detection data S4.

Third Modification

In the embodiment, attention is paid to the path between one end of the first resistive film 102 and one end of the second resistive film 104 as at least one path, but, in addition, or instead, the initial data S3 and the detection data S4 may be generated based on impedance of another path. For example, one of the M number of paths may be the path between the first terminal XP and the second terminal XN. That is, the impedance of this path is equivalent (or substantially equivalent) to the resistance value Rx of the first resistive film 102. Further, the other of the M number of paths may be the path between the third terminal YP and the fourth terminal YN. That is, the impedance of this path is equivalent (or substantially equivalent) to the resistor value $R_Y$ of the second resistive film 104. It is desirable that these paths be measured in a state in which the user does not touch the touch panel. By detecting deterioration of the first resistive film 102 and the second resistive film 104 and calibrating the coordinate detection circuit 202, it is possible to detect more accurate coordinates.

Fourth Modification

In the embodiment, the presence or absence of deterioration is determined based on a difference between the initial data S3 and the detection data S4, but the present disclosure is not limited thereto. For example, the presence or absence of deterioration may be determined based on a ratio between the initial data S3 and the detection data S4. Otherwise, a function f(S3, S4) using the initial data S3 and the detection data S4 as factors is defined, and the presence or absence of deterioration may be determined based on a comparison between the value of the function f(S3, S4) and a threshold value. Otherwise, preparing a table matching a combination of the initial data and the detection data with the presence or absence of deterioration makes it possible to determine the presence or absence of deterioration by referring to the table.

Fifth Modification

Some or all of the functions of the coordinate generating circuit 210 of the control circuit 200 may be implemented in an IC (for example, a microcomputer) different from the control circuit 200.

Sixth Modification

In a case where a plurality of reference points REFs are defined, the initial data S3 and the detection data S4 may include individual data for each of the reference points REFs. Further, the coordinate detection circuit 202 may be calibrated based on a plurality of initial data S3 and a plurality of detection data S4 corresponding to the plurality of reference points REF.

Seventh Modification

The algorithm for coordinate detection in a two-point touch is not limited, and another well-known algorithm may be employed.

Eighth Modification

In this embodiment, attention is focused on a change in the resistance value of the touch panel 100 mainly due to the aged deterioration, and its calibration has been described. However, according to a structure or a material of the touch panel 100, its resistance value may be changed depending on a temperature. According to the control circuit 200 of the embodiment, it is also possible to calibrate characteristic fluctuation of the touch panel 100 caused by temperature change.

According to the present disclosure in some embodiments, it is possible to suppress degradation in accuracy of coordination detection due to the aged deterioration.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a touch panel, which includes:
   a first resistive film and a second resistive film arranged with a gap therebetween;
   a first terminal and a second terminal drawn from two opposite sides of the first resistive film; and
   a third terminal and a fourth terminal drawn from two opposite sides of the second resistive film,
   the control circuit comprising:
   a coordinate detection circuit including an impedance detection circuit configured to generate an impedance detection signal corresponding to an impedance of the touch panel and a voltage detection circuit configured to generate a voltage detection signal corresponding to at least one of voltages of the first terminal, the second terminal, the third terminal, or the fourth terminal, the impedance detection signal and the voltage detection signal being used for generating a coordinate touched by a user;
   a memory configured to store initial data corresponding to an initial state impedance of at least one predetermined path of the touch panel, which is pre-measured in an initial state; and
   a calibration circuit configured to acquire an operation state impedance of the at least one predetermined path, which is measured in an operation state, and calibrate the coordinate detection circuit based on detection data corresponding to the operation state impedance of the at least one predetermined path and the initial data corresponding to the initial state impedance of the at least one predetermined path,
   wherein the calibration circuit is configured to calibrate the coordinate detection circuit when a difference between the initial data and the detection data is between a first threshold value and a second threshold value which is set to be higher than the first threshold value, and
   wherein the calibration circuit is configured not to calibrate the coordinate detection circuit when the difference between the initial data and the detection data is greater than the second threshold value.

2. The control circuit of claim 1, wherein at least one reference point is defined on the touch panel and the at least one predetermined path corresponds to the at least one reference point, and
   wherein when one of the at least one reference point is one-point touched, each of the at least one predetermined path is a path from one of the first terminal and the second terminal to one of the third terminal and the fourth terminal.

3. The control circuit of claim 2, wherein the calibration circuit is configured to acquire the operation state impedance of the path when the coordinate detection circuit detects a one-point touch in the operation state and a coordinate of the one-point touch corresponds to the at least one reference point.

4. The control circuit of claim 2, wherein the at least one predetermined path includes a plurality of paths, and
   wherein each of the initial data and the detection data corresponds to an average value of at least two impedances of the plurality of paths.

5. The control circuit of claim 2, wherein one reference point of the at least one reference point is determined to be a position which is touched by the user more times statistically than other reference points.

6. The control circuit of claim 1, wherein the at least one predetermined path includes a plurality of paths, and
   wherein the calibration circuit is configured to calibrate the coordinate detection circuit when impedances of all of the plurality of paths are measured.

7. The control circuit of claim 1, wherein the calibration circuit is configured to correct scaling of the impedance detection circuit.

8. The control circuit of claim 1, wherein the impedance detection circuit includes:
   an I/V conversion circuit configured to convert a current flowing through the touch panel into a voltage; and
   an A/D converter configured to convert the voltage of the I/V conversion circuit to a digital value.

9. The control circuit of claim 8, wherein the calibration circuit is configured to correct a gain of the I/V conversion circuit.

10. The control circuit of claim 8, wherein the calibration circuit is configured to correct a reference voltage to be supplied to the A/D converter.

11. The control circuit of claim 8, wherein the calibration circuit is configured to correct the digital value of the A/D converter.

12. The control circuit of claim 1, wherein the coordinate detection circuit includes a coordinate generating circuit configured to generate a coordinate touched by the user, and
    wherein the calibration circuit is configured to correct a calculation processing of the coordinate generating circuit.

13. The control circuit of claim 1, wherein the calibration circuit is configured to update the initial data in the memory based on the detection data.

14. The control circuit of claim 1, wherein the at least one predetermined path includes a path from the first terminal to the second terminal.

15. The control circuit of claim 1, wherein the at least one predetermined path includes a path from the third terminal to the fourth terminal.

16. The control circuit of claim 1, wherein the control circuit is integrated on a single semiconductor substrate.

17. A touch panel input device, comprising:
    a touch panel; and
    the control circuit of claim 1, connected to the touch panel.

18. An electronic device having the touch panel input device of claim 17.

19. A control method of a touch panel, which includes:
a first resistive film and a second resistive film arranged with a gap therebetween;
a first terminal and a second terminal drawn from two opposing sides of the first resistive film; and
a third terminal and a fourth terminal drawn from two opposing sides of the second resistive film, and
the control method comprising:
detecting, by a coordinate detection circuit, a coordinate touched by a user based on an impedance detection signal corresponding to an impedance of the touch panel and a voltage detection signal corresponding to at least one of voltages of the first terminal, the second terminal, the third terminal, or the fourth terminal, the coordinate detection circuit being configured to generate the impedance detection signal and the voltage detection signal;
measuring an initial state panel impedance between one of the first terminal and the second terminal and one of the third terminal and the fourth terminal and storing initial data corresponding to the measured panel impedance in a first memory, when each of at least one reference point, which is defined on the touch panel, is pre-touched in an initial state;
storing detection data corresponding to an operation state panel impedance in a second memory when a one-point touch is detected in an operation state and a coordinate for the one-point touch corresponds to the at least one reference point;
determining whether a difference between the initial data and the detection data is between a first threshold value and a second threshold value which is set to be higher than the first threshold value, or whether the difference is greater than the second threshold value,
upon determining that the difference is between the first threshold value and the second threshold value, calibrating the coordinate detection circuit based on the detection data stored in the second memory; and
upon determining that the difference is greater than the second threshold value, determining not to calibrate the coordinate detection circuit.

* * * * *